(12) United States Patent
Bendixen et al.

(10) Patent No.: US 11,159,081 B2
(45) Date of Patent: Oct. 26, 2021

(54) MAGNETIC RACK-AND-PINION COUPLING SYSTEM AND SEA WAVE ENERGY CONVERSION SYSTEM

(71) Applicant: GRUNDFOS HOLDING A/S, Bjerringbro (DK)

(72) Inventors: Flemming Buus Bendixen, Hobro (DK); Alexandru Sorea, Aalborg (DK); Tanja Johnsen, Mariager (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 17/255,069

(22) PCT Filed: Jun. 28, 2019

(86) PCT No.: PCT/EP2019/067280
§ 371 (c)(1),
(2) Date: Dec. 22, 2020

(87) PCT Pub. No.: WO2020/002568
PCT Pub. Date: Jan. 2, 2020

(65) Prior Publication Data
US 2021/0273546 A1 Sep. 2, 2021

(30) Foreign Application Priority Data
Jun. 29, 2018 (EP) .................................... 18180948

(51) Int. Cl.
*H02K 49/10* (2006.01)
*H02K 7/18* (2006.01)
*F03B 13/18* (2006.01)

(52) U.S. Cl.
CPC ........... *H02K 49/108* (2013.01); *F03B 13/18* (2013.01); *H02K 7/1853* (2013.01)

(58) Field of Classification Search
CPC .. H02K 49/108; H02K 7/1853; H02K 49/102; F03B 13/18
See application file for complete search history.

(56) References Cited

U.S. PATENT DOCUMENTS

2014/0103765 A1   4/2014 Post
2015/0263597 A1*  9/2015 Kidd .................... H02K 49/102
                                                  310/103

FOREIGN PATENT DOCUMENTS

WO    9622630 A1   7/1996
WO    2004005760 A1   1/2004
(Continued)

OTHER PUBLICATIONS

McGilton Ben et al.: "Review of magnetic gear technologies and their applications in marine energy", IET Renewable Power Generation, The Institution of Engineering and Technology, Michael Faraday House, Six Hills Way, Stevenage, Herts. SG1 2AY, UK, vol. 12, No. 2, Feb. 5, 2018 (Feb. 5, 2018), pp. 174-181, XP006065287, ISSN: 1752-1416, DOI: 10.1049/IET-RPG.2017.0210 the whole document.

*Primary Examiner* — Viet P Nguyen
(74) *Attorney, Agent, or Firm* — McGlew and Tuttle, P.C.

(57) ABSTRACT

The present disclosure refers to a magnetic rack-and-pinion coupling system (1) for contactless transfer of kinetic energy comprising:
a rack component (3) comprising a first pattern of ferromagnetic structure being repetitive along a rack length axis (L), and
a pinion stack component (5) being rotatable about a rotor axis (R),
wherein the rack component (3) and/or the pinion stack component (5) are movable relative to each other along the rack length axis (L), and wherein the pinion stack component (5) comprises a stack of pinion discs (9a,b,c,d) each (Continued)

comprising a second pattern of ferromagnetic structure being repetitive along a circumference of the respective pinion disc (9*a,b,c,d*), wherein at least one magnetic field producing element (13*a,b,c*) is sandwiched between neighbouring pinion discs (9*a,b,c,d*), wherein each magnetic field producing element (13*a,b,c*) has one magnetic pole (N, S) at an axial front side (14) of the magnetic field producing element (13*a,b,c*) and the other magnetic pole (S, N) at an axial end side (16) of the magnetic field producing element (13*a,b,c*).

26 Claims, 12 Drawing Sheets

(56) References Cited

FOREIGN PATENT DOCUMENTS

| WO | 2010130821 | A2 | 11/2010 |
|---|---|---|---|
| WO | 2014148349 | A1 | 9/2014 |

* cited by examiner

MAGNETIC RACK-AND-PINION COUPLING SYSTEM AND SEA WAVE ENERGY CONVERSION SYSTEM

TECHNICAL FIELD

The present disclosure is directed to a magnetic rack-and-pinion coupling system for contactless transfer of kinetic energy, and a sea wave energy conversion system with such a magnetic rack-and-pinion coupling system.

BACKGROUND

WO 2010/130821 A2 describes a mechanical rack-and-pinion coupling system in a sea wave energy conversion system. The mechanical rack-and-pinion coupling system is used to transfer kinetic energy between a linear motion and a rotational motion. A toothed gear as a pinion of a mechanical rack-and-pinion coupling system positively engages with corresponding teeth of the rack so that a linear motion of the rack exerts a torque on the pinion.

The mechanical rack-and-pinion coupling system is, however, inherently susceptible to wear and frictional losses. In particular, the adverse conditions in sea water require regular maintenance. Furthermore, the mechanical rack-and-pinion coupling system does not allow for slippage if the highly varying heaving forces of the sea waves exceed a certain threshold above which the structural integrity of the mechanical rack-and-pinion coupling system may be at risk.

SUMMARY

In contrast to such known sea wave energy conversion systems with a mechanical rack-and-pinion coupling system, embodiments of the present disclosure provide a contactless transfer of kinetic energy that is less susceptible to wear and frictional loss; and requires less maintenance.

The principle idea underlying the present disclosure for achieving this is to apply a magnetic rack-and-pinion coupling system for contactless transfer of kinetic energy in a sea wave energy conversion system, wherein the magnetic rack-and-pinion coupling system provides a sufficient torque transfer.

In accordance with a first aspect of the present disclosure, a magnetic rack-and-pinion coupling system is therefore provided for contactless transfer of kinetic energy comprising:
 a rack component comprising a first pattern of ferromagnetic structure being repetitive along a rack length axis, and
 a pinion stack component being rotatable about a rotor axis, wherein the rack component and/or the pinion stack component are movable relative to each other along the rack length axis, and wherein the pinion stack component comprises a stack of pinion discs each comprising a second pattern of ferromagnetic structure being repetitive along a circumference of the respective pinion disc, wherein at least one magnetic field producing element is sandwiched between neighbouring pinion discs, wherein each magnetic field producing element has one magnetic pole at an axial front side of the magnetic field producing element and the other magnetic pole at an axial end side of the magnetic field producing element opposite the axial front side of the magnetic field producing element.

Such a magnetic rack-and-pinion coupling system may be used for any kind of contactless transfer of kinetic energy, not only for sea wave energy conversion. However, it is particularly useful for sea wave energy conversion, because the heaving forces of sea waves vary highly and may exceed a certain threshold above which the structural integrity of a mechanical coupling would be at risk.

Additionally, the magnetic rack-and-pinion coupling system according to the present disclosure allows for slippage without introducing any damage or wear to the system. As the magnetic rack-and-pinion coupling system allows for a gap between the rack component and the pinion stack component, the rack component and/or the pinion stack component can be separately encapsulated or physically kept apart. This is advantageous in sea wave energy conversion systems where it allows the components to be protected from the corrosive environment of sea water so that less maintenance is needed. The rack-and-pinion coupling according to the invention is likewise advantageous in applications where it is desired simply to have a clear physical separation between the rack and the pinion components, for example for hygiene reasons such as in the food or medicine industry.

The stack arrangement of the magnetic field producing element sandwiched between two pinion discs having a pattern of ferromagnetic structure along the circumference provides for a sufficient torque transfer, because the magnetic flux depends on the position of the two repetitive patterns of ferromagnetic structure relative to each other. Thereby, a motion of the rack component and/or the pinion stack component relative to each other along the rack length axis exerts a torque on the pinion stack component to rotate about the rotor axis.

Analogously, the pinion stack component may be driven by a motor to rotate and thereby exerts a driving torque on the rack component for displacement and/or rotation of the rack component. It is to be understood that the magnetic rack-and-pinion coupling system may be used to convert translational and/or rotational kinematic energy to rotational kinematic energy and/or vice versa.

Optionally, the rack length axis may at least partially extend along a linear, arc-shaped, circular and/or curved axis, i.e. along a path of relative motion between the rack component and the pinion component. For instance, the rack component may at least partially define a linear axis by its repetitive first pattern of ferromagnetic structure along this axis. The relative motion between the rack component and the pinion component may then also be directed along this linear axis. Alternatively, or in addition, the rack component may at least partially define an arc-shaped axis along which the relative motion between the rack component and the pinion component takes place. Alternatively, or in addition, the rack component may at least partially define a circular and/or curved path along which the relative motion between the rack component and the pinion component takes place.

Optionally, the first pattern of ferromagnetic structure may be arranged at least partially along a full or partial cylindrical plane having a centre axis essentially parallel to the rotor axis, wherein the rack length axis extends in circumferential direction along the cylindrical plane. Preferably, the diameter of the cylindrical plane is at least three times larger than the diameter of the pinion stack component. The first pattern of ferromagnetic structure may face radially inward and/or outward. If it faces inward, the pinion stack component is preferably placed radially inward from the rack component. If it faces outward, the pinion stack component is preferably placed radially outward from the rack component. Due to the substantial differences in diameter, a rotational motion of the rack component (unidirectional, bidirectional, continuous or oscillating) appears to the pinion stack component as an almost-linear motion in the limited area of magnetic coupling between them.

Optionally, the first pattern of ferromagnetic structure may be arranged at least partially along a full or partial circular path on a full or partial annular plane having a centre axis extending transversely, such as essentially perpendicularly, to the rotor axis, wherein the rack length axis extends along the circular path. Analogous to the previously described embodiment, it is preferred that the average diameter of the annular plane is at least three times larger than the diameter of the pinion stack component. Due to the substantial differences in diameter, a rotational motion of the rack component (unidirectional, bidirectional, continuous or oscillating) appears to the pinion stack component as an almost-linear motion in the limited area of magnetic coupling between them. It should be noted that, as the rotor axis of the pinion stack component points radially inward or outward above or below the annular plane of the rack component, the velocity vector $\vec{v} = \vec{\omega} \times \vec{r}$ of the first pattern of ferromagnetic structure increases radially outward for a given angular velocity of the rack component. Therefore, it is preferred in this embodiment to adapt the diameter of the individual pinion discs accordingly. This means that radially more inwardly located pinion discs should have a smaller diameter than radially more outward pinion discs to compensate for the radially outwardly increasing velocity vector $\vec{v} = \vec{\omega} \times \vec{r}$ of the first pattern of ferromagnetic structure. Preferably, the pinion discs may have a conical frustrum shape with radially inwardly decreasing diameter. The rotor axis of the pinion stack component may be tilted to compensate for the different gap between the first and second ferromagnetic structure that results from the different diameters of the pinion discs. Alternatively, or in addition, the first ferromagnetic structure may be bevelled adapted to compensate for this. The rack component and the pinion stack component may thus be coupled similar to bevel gears.

Optionally, at least one or all of the magnetic field producing elements may comprise a permanently magnetic disc. The magnetic disc may be primarily comprised of permanently magnetic material.

Optionally, at least one or all of the magnetic field producing elements may comprise a coil. The coil is preferably wound around the rotor axis. Electric current through the coil may produce a magnetic field with one magnetic pole at an axial front side of the magnetic field producing element and the other magnetic pole at an axial end side of the magnetic field producing element. By switching the direction of the current, the magnetic poles may be switched. Preferably, if neighbouring magnetic field producing elements comprise a coil, they are wound in different directions. Thereby, the coils may be electrically connected in series to produce alternating pole orientation between neighbouring magnetic field producing elements.

Using a coil in at least one magnetic field producing element instead of a permanently magnetic disc has on the one hand the disadvantage that the supply of electric current costs some energy. On the other hand, the magnetic field producing element comprising a coil may be less expensive and less complicated to produce. Furthermore, the magnetic field may be better controllable by a coil, so that losses at fast movements may be minimised. Both coils and permanent magnets may be used in combination in the pinion stack component as magnetic field producing elements.

Optionally, the pinion stack component may comprise a stack of N≥3 pinion discs and N−1 magnetic field producing elements, wherein each magnetic field producing element is sandwiched between two neighbouring pinion discs. The transferable maximum torque increases with the number N−1 of magnetic field producing elements. For example, 10 pinion discs may be used with 9 magnetic field producing elements stacked in-between. Those pinion discs between two neighbouring magnetic field producing elements are more effectively used to transfer magnetic flux than the two pinion discs at the axial ends of the stack. Therefore, the two pinion discs at the axial ends of the stack may have a smaller axial width, e.g. half the width of the other pinion discs. However, in order to reduce the diversity of system components all pinion discs may be identical. Analogously, all magnetic field producing elements may be identical in shape and size. It is also possible to arrange a magnetic field producing element at one axial end or both axial ends of the pinion stack component.

Optionally, the magnetic field producing elements may be arranged in such a way that the magnetic pole orientation alternates between neighbouring magnetic field producing elements. This doubles the magnetic flux density through those pinion discs which are arranged between two neighbouring magnetic field producing elements. Thereby, the transferable torque is significantly increased.

Optionally, the second pattern of ferromagnetic structure may be formed by teeth extending radially further than the diameter of the magnetic field producing element(s). The pinion discs may be integrally comprised of ferromagnetic material like iron, wherein the pattern is defined by the teeth similar to a mechanical gear. Alternatively, the pinion discs may comprise at least two materials one of which is ferromagnetic and forming the radially extending teeth. As the teeth are not in mechanical contact with the rack, the shape of the teeth may be optimised for maximum magnetic flux between the teeth and the first pattern of ferromagnetic structure of the rack. The flanks of the teeth may extend radially or parallel to each other. Alternatively, or in addition, the bottom land of the tooth space may be round with a single circular or oval fillet between neighbouring teeth. In contrast to a mechanical gear, the top land of the teeth is very important for the transfer of magnetic flux. Therefore, the preferably planar top land of each tooth is preferably of essentially the same size as the root of each tooth. The ratio of the size of the top land of the teeth to the size of the bottom land of the tooth spaces may be in the range of 0.8 to 1.5, such as in the range of 0.8 to 1.25. The tooth space may be filled with non-ferromagnetic material or not filled.

Optionally, the first pattern of ferromagnetic structure may be formed by a row of ferromagnetic bars extending along a lateral alignment direction and/or by a side of the rack component having a crenelated shape along the linear axis. The lateral alignment direction may be essentially orthogonal to the linear axis or skewed as will be explained below.

Optionally, the first pattern of ferromagnetic structure may define a first period and the second pattern of ferromagnetic structure may define a second period, wherein the ratio between the first period and the second period ranges between 0.8 and 1.25. Preferably, the first period and the second period are essentially equal.

Optionally, the lateral width of the first pattern of ferromagnetic structure across the linear axis may essentially be the same as or larger than the axial width of the stack of pinion discs along the rotor axis.

Optionally, the longitudinal length of the first pattern of ferromagnetic structure along the linear axis may be at least twice as long as the diameter of the stack of pinion discs. This allows at least more than a half rotation of the stack of pinion discs.

Optionally, the first pattern of ferromagnetic structure may be skewed by an angle $\alpha$, wherein the angle $\alpha$ is spanned between a lateral alignment direction of the first pattern of ferromagnetic structure and a cross axis of the rack component perpendicular to the linear axis. The skewed pattern may reduce a "sputtering" or "staggering" of the torque transfer. A steadier torque transfer over time may be achieved by this to the detriment of a reduced maximum torque transfer.

Optionally, two neighbouring pinion discs may have a rotational position shifted by an angle $\beta$ with respect to each other. In combination with a first pattern of ferromagnetic structure being skewed by the angle $\alpha$, the angle $\beta$ may be correspondingly chosen so that all pinion discs have the same phase with respect to the skewed first pattern of ferromagnetic structure of the rack component. This reduces a "sputtering" or "staggering" of the torque transfer while the undesired reduction of maximum torque transfer is minimised.

Optionally, the second pattern of ferromagnetic structure of each pinion disc may be skewed by a twist angle $\gamma$ about the rotor axis. In combination with a first pattern of ferromagnetic structure being skewed by the angle $\alpha$ and the shifted rotational position of the pinion discs, the angle $\gamma$ may be correspondingly chosen to align the pinion teeth with the skewed rack structure to achieve a smooth torque transfer while reducing the negative effect of reduced maximum torque transfer introduced by the skewing.

Optionally, the system may further comprise a separating non-ferromagnetic wall structure extending along a gap between the first pattern of ferromagnetic structure and the second pattern of ferromagnetic structure. The wall structure may be a wall of a housing that encapsulates the rack component and/or the pinion stack component. The wall component may, for instance, comprise stainless steel and/or plastic. As the torque transfer reduces with an increased gap distance between the first pattern of ferromagnetic structure and the second pattern of ferromagnetic structure, the wall may be chosen as thin as possible to allow a small distance between the rack component and the pinion stack component.

Optionally, the first pattern of ferromagnetic structure and/or the second pattern of ferromagnetic structure may be coated by a protective layer. Such a layer may be a wall structure, a coating and/or an oxidised or deposited layer. The ferromagnetic structures and/or the magnetic field producing elements may thereby be protected against corrosion.

It should be noted that the magnetic rack-and-pinion coupling system may comprise two or more pinion stack components that may drive a rack component or may be driven by a rack component. For instance, several pinion stack components may be arranged in a row along the rack length axis so that their rotor axes are essentially perpendicular to the rack length axis. Alternatively, or in addition, the magnetic rack-and-pinion coupling system may comprise two or more rack components that may drive a pinion stack component or may be driven by a pinion stack component. For instance, two rack components may magnetically couple to radially opposite sides of the same pinion stack component and have mutually inversed directions of motion along their rack length axes.

In accordance with a second aspect of the present disclosure, a sea wave energy conversion system is provided comprising
a guiding structure defining a rack length axis,
a buoyance body being movable along the rack length axis relative to the guiding structure, and
at least one magnetic rack-and-pinion coupling system as described above,
wherein the at least one magnetic rack-and-pinion coupling system is configured to transfer a motion of the buoyance body relative to the guiding structure to a rotational motion of a rotor axis for driving at least one electric generator.

Optionally, the guiding structure may be configured to be anchored or fixed relative to the seabed. In addition, or alternatively, the guiding structure may be buoyant and configured to follow heaving forces of sea waves with quicker or slower compared to the buoyance body. Thereby, the sea waves drive a motion of the buoyant body relative to the fixed and/or buoyant guiding structure.

Optionally, the rack component of the at least one magnetic rack-and-pinion coupling system may be mechanically coupled or fixed to the buoyance body and the pinion stack component of the at least one magnetic rack-and-pinion coupling system may be mechanically coupled or mounted to the guiding structure.

Optionally, the sea wave energy conversion system may comprise M≥2 magnetic rack-and-pinion coupling systems, wherein the magnetic rack-and-pinion coupling systems are arranged in an M-fold rotational symmetry with respect to the rack length axis. Thereby, it is less likely that the system gets jammed along the motion between the buoyant body and the guiding structure.

Optionally, the guiding structure may define a tubular inner volume along the rack length axis, wherein the buoyant body is arranged at least partially within the tubular inner volume and configured to follow the sea water level within the tubular inner volume. The tubular inner volume is open to be flooded with sea water so that there is an up- and downward movement of the sea water level within the tubular inner volume according to the sea waves. The tubular inner volume may have any cross-sectional shape, e.g. round, oval, squared, triangular, hexagonal or any other. Preferably, the tubular inner volume may have a cross-sectional shape of an M-sided regular polygon, so that M magnetic rack-and-pinion coupling systems can be arranged in an M-fold rotational symmetry with one magnetic rack-and-pinion coupling system being arranged at each side of the tubular inner volume.

SUMMARY OF THE DRAWINGS

Embodiments of the present disclosure will now be described by way of example with reference to the following figures of which.

DETAILED DESCRIPTION

Figure 1:
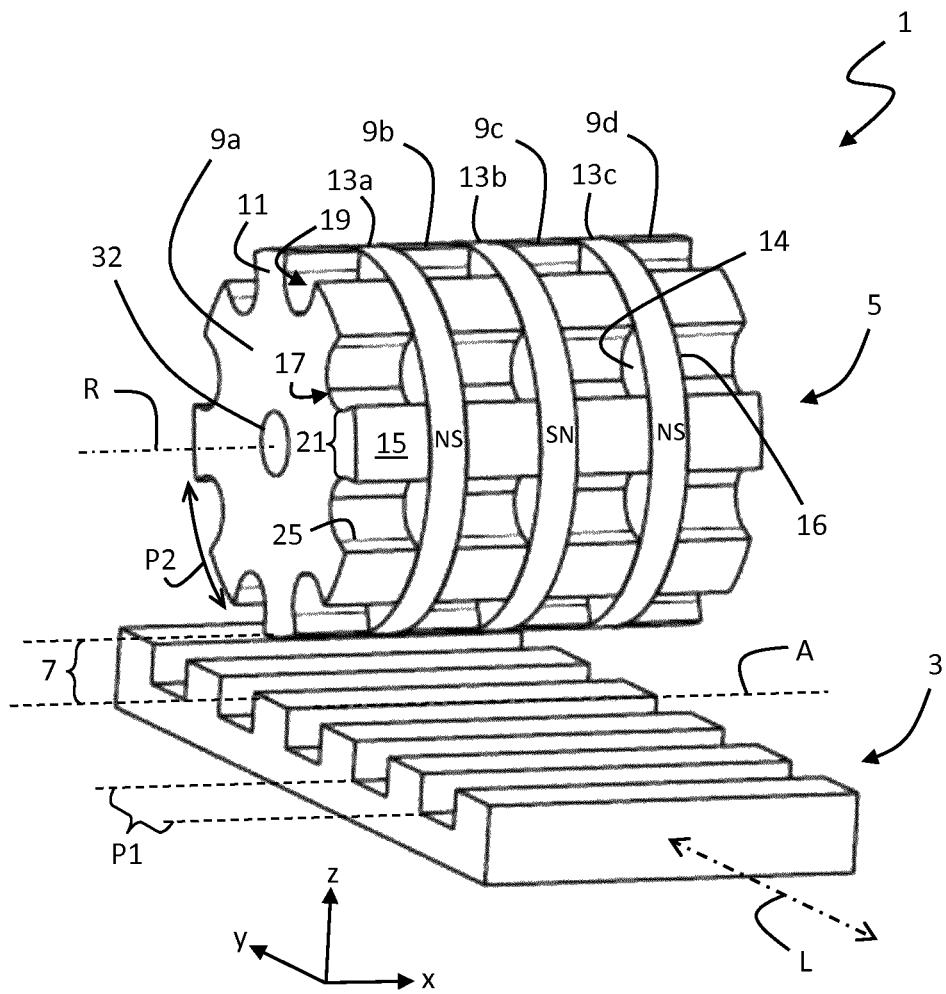
FIG. 1 shows a schematic perspective view on an example of an embodiment of the magnetic rack-and-pinion coupling system according to the present disclosure.

FIG. 1 shows a magnetic rack-and-pinion coupling system 1 for contactless transfer of kinetic energy. The system 1 comprises a rack component 3 and a pinion stack component 5. The rack component 3 comprises a first pattern of ferromagnetic structure being repetitive along a rack length axis L which here is a linear axis. The pinion stack component 5 is rotatable about a rotor axis R. For a better orientation, a right-handed Cartesian coordinate system is displayed in FIG. 1, wherein the x-axis extends along the rotor axis R and the y-axis extends along the linear rack length axis L. The z-axis is the direction along which a gap 7 between the rack component 3 and the pinion stack component 5 extends.

In the embodiment of FIG. 1, the rack component 3 is a single integral part made of ferromagnetic material, wherein the first pattern of ferromagnetic structure is defined by a crenelated top side forming teeth that extend like bars along a lateral alignment direction A, which extends along the x-axis in this embodiment. The first pattern of ferromagnetic structure defines a first period P1.

Figure 2:
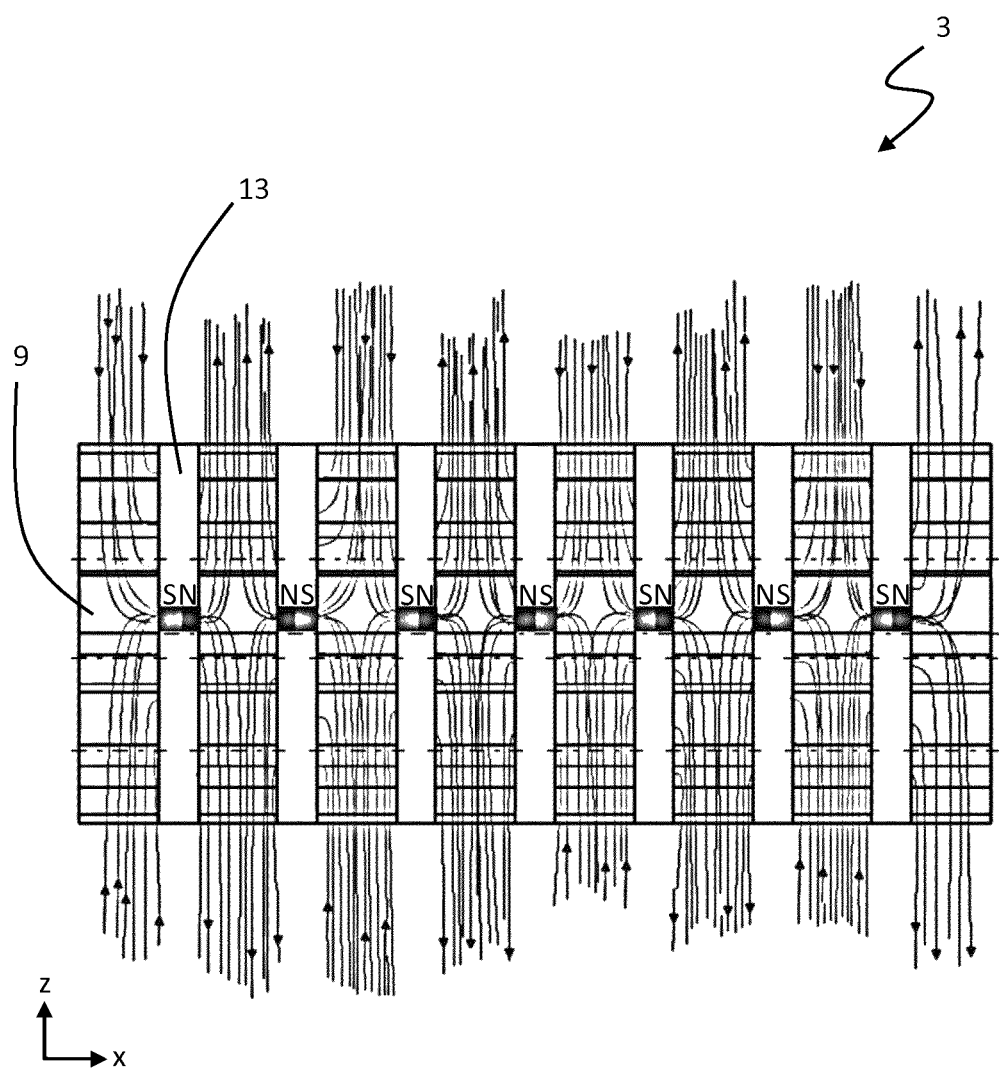
FIG. 2 shows schematically a longitudinal cut view on an example of a pinion stack component of another embodiment of the magnetic rack-and-pinion coupling system according to the present disclosure.

The pinion stack component 5 comprises a stack of—in this embodiment—four identical pinion discs 9a,b,c,d each comprising a second pattern of ferromagnetic structure being repetitive along a circumference of the respective pinion disc 9a,b,c,d. In the embodiment of FIG. 1, each of the four pinion discs 9a,b,c,d is a single integral part made of ferromagnetic material, wherein the second pattern of ferromagnetic structure is formed as radially extending teeth 11 like teeth of a mechanical gear. The second pattern of ferromagnetic structure defines a second period P2, wherein the ratio between the first period P1 and the second period P2 is essentially 1 or ranges between 0.8 and 1.25. The pinion stack component 5 further comprises three magnetic field producing elements 13a,b,c, wherein each magnetic field producing element 13a,b,c is sandwiched between two neighbouring pinion discs 9a,b,c,d. Each magnetic field producing element 13a,b,c is permanently magnetic with one magnetic pole N,S at an axial front side 14 of the magnetic field producing element 13a,b,c and the other magnetic pole S,N at an axial end side 16 of the magnetic field producing element 13a,b,c. The magnetic field producing elements 13a,b,c are arranged in such a way that the magnetic pole orientation alternates between neighbouring magnetic field producing elements 13a,b,c. This means that the axially central magnetic field producing element 13b has a different magnetic pole orientation than the other axially outer two magnetic field producing elements 13a,c. FIG. 2 illustrates this nicely by showing magnetic field lines in another embodiment of the pinion stack component. The alternating magnetic pole orientation is applicable in all embodiments of the present disclosure.

The magnetic field producing elements 13a,b,c in FIG. 1 are all permanently magnetic discs. Alternatively, one, some or all of the magnetic field producing elements 13a,b,c may comprise a coil. Analogous to the permanently magnetic disc(s), an electric current through such coil(s) may generate a magnetic field with one magnetic pole N,S at the axial front side 14 of the magnetic field producing element 13a,b,c and the other magnetic pole S,N at the axial end side 16 of the magnetic field producing element 13a,b,c.

In FIG. 1, the rack component 3 and/or the pinion stack component 5 are movable relative to each other along the linear rack length axis L. A relative motion along the linear axis L results in a torque on the pinion stack component 5 around the rotor axis R, because the magnetic flux is influenced by the relative position between the bars of the rack component 3 and the teeth 11 of the pinion discs 9a,b,c,d. The rotation of the pinion stack component 5 induced by a relative linear motion of the rack component 3 may be used to drive an electric generator, for instance. The relative linear motion of the rack component 3 may for instance be induced by heaving forces of sea waves as explained in more detail below. Analogously, a motor may drive the pinion stack component 5 to rotate and thereby induces a linear displacement of the rack component 3.

In the embodiment shown in FIG. 1, the radius of the magnetic field producing elements 13a,b,c is essentially the same as the diameter of the pinion discs 9a,b,c,d from the rotor axis R to the top land 15 of the teeth 11. However, as the material for the magnetic field producing elements 13a,b,c is more expensive than the ferromagnetic material of the pinion discs 9a,b,c,d, the magnetic field producing elements 13a,b,c can be designed as axially thinner and radially smaller without compromising too much on the maximally transferable torque. It was found that the magnetic field producing elements 13a,b,c can be designed axially thinner than the pinion discs 9a,b,c,d. The axial thickness of the magnetic field producing elements 13a,b,c may be 30% or more of the axial thickness of the pinion discs 9a,b,c,d without compromising too much on the maximally transferable torque. The radial extension of the magnetic field producing elements 13a,b,c can be reduced such that the teeth 11 extend radially further than the diameter of the magnetic field producing elements 13a,b,c (see FIGS. 4, 6, 8 and 9).

The bottom land 17 of the tooth spaces 19 is in the embodiment of FIG. 1 round with a single circular or oval fillet between neighbouring teeth 11. In contrast to a mechanical gear, the top land 15 of the teeth 11 is very important for the transfer of magnetic flux. Therefore, the ratio between the angular width of the top land 15 of each tooth 11 and the angular width of the root 21 of each tooth 11 ranges between 0.8 and 1.25, and is preferably essentially 1.

Figure 3:
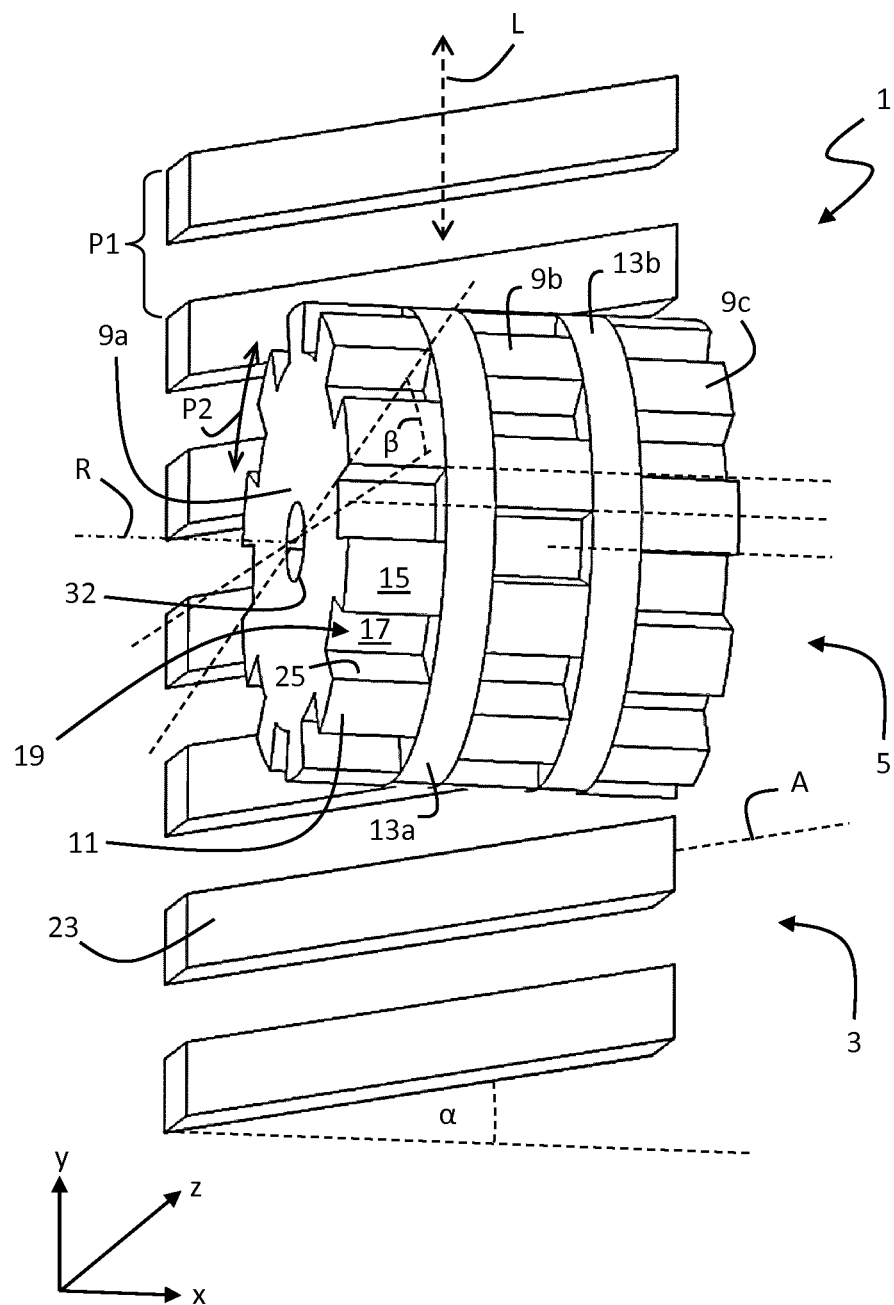
FIG. 3 shows a schematic perspective view on an example of yet another embodiment of the magnetic rack-and-pinion coupling system according to the present disclosure.
Figure 4:
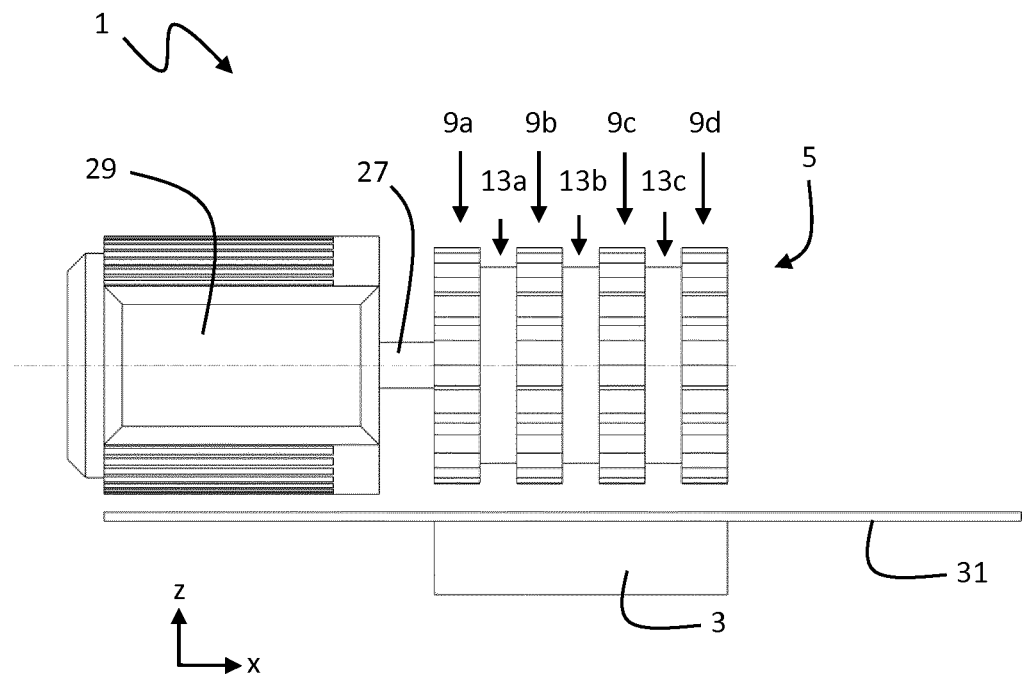
FIG. 4 shows a schematic side view on an example of yet another embodiment of the magnetic rack-and-pinion coupling system according to the present disclosure together with an electric generator or motor.

The embodiment of FIG. 3 differs from the embodiment of FIG. 1 in several aspects. Firstly, the rack component 3 is not a single integral part of ferromagnetic material, but composed of a row of ferromagnetic bars 23 extending along a lateral alignment direction A. Secondly, the lateral alignment direction A does not extend along the x-axis, but is skewed by an angle α, wherein the angle α is spanned between a lateral alignment direction A and the x-axis. Thirdly, the pinion stack component 5 only comprises three pinion discs 9a,b,c and two magnetic field producing elements 13a,b. Fourthly, neighbouring pinion discs 9a,b,c have a rotational position shifted by an angle β with respect to each other. In combination with the bars 23 being skewed by the angle α, the angle β is correspondingly chosen so that all pinion discs 9a,b,c have the same phase with respect to the skewed bars 23 of the rack component 3. This reduces a "sputtering" or "staggering" of the torque transfer. As indicated by the dashed lines, the shift angle β corresponds to a relative angular shift about half the circular width of the teeth 11 between neighbouring pinion discs 9,a,b,c. Fifthly and finally, the shape of the teeth 11 is different with a flat bottom land 17 of the tooth spaces 19 and radially extending flanks 25.

Figure 5:
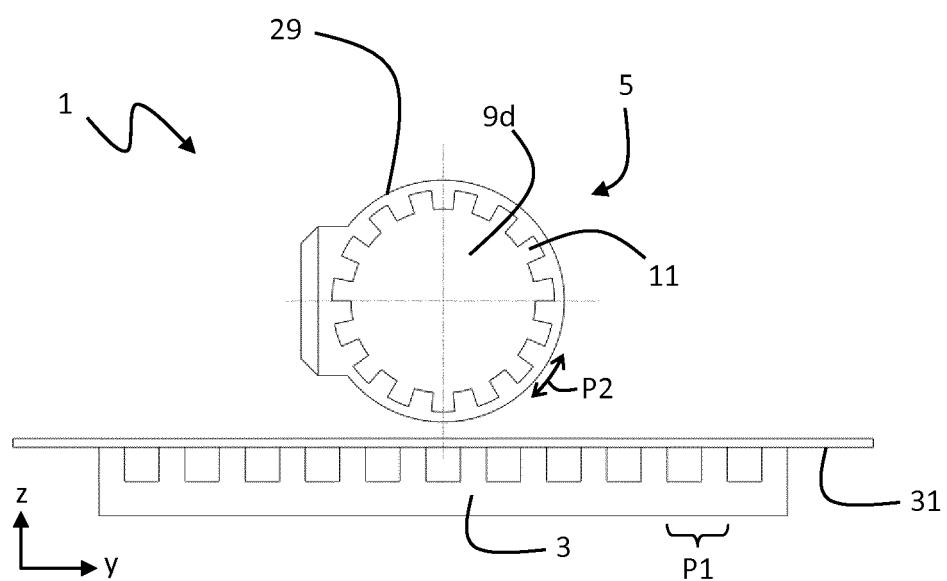
FIG. 5 shows a schematic cross-sectional cut view on an example of the embodiment shown in FIG. 4.
Figure 6:
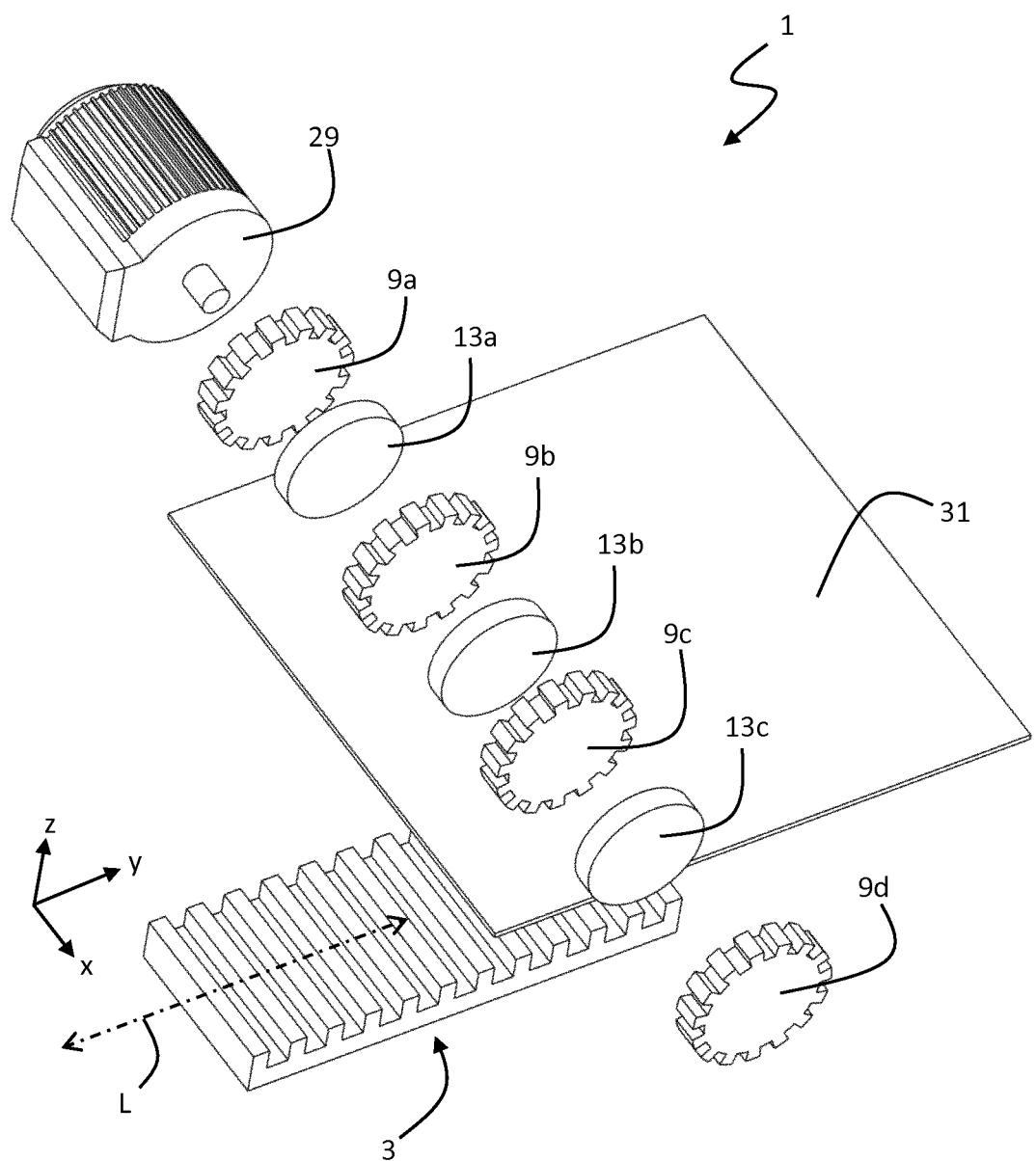
FIG. 6 shows a schematic exploded perspective view on an example of the embodiment shown in FIGS. 4 and 5.

The embodiment shown in FIGS. 4, 5 and 6 has again four pinion discs 9a,b,c,d and three magnetic field producing elements 13a,b,c, wherein no skew angle α or shift angle β is applied. The shape of the teeth 11 is essentially the same as in FIG. 3. The rack component 3 is a single integral ferromagnetic part with a crenelated top side as shown in FIG. 1. The pinion stack component 5 is coupled to a rotor axle 27 along the rotor axis R for driving an electric generator 29 or to be driven by any kind of motor 29. A separating wall structure 31 is placed in the gap 7 between the rack component 3 and the pinion stack component 5.

Figure 7:
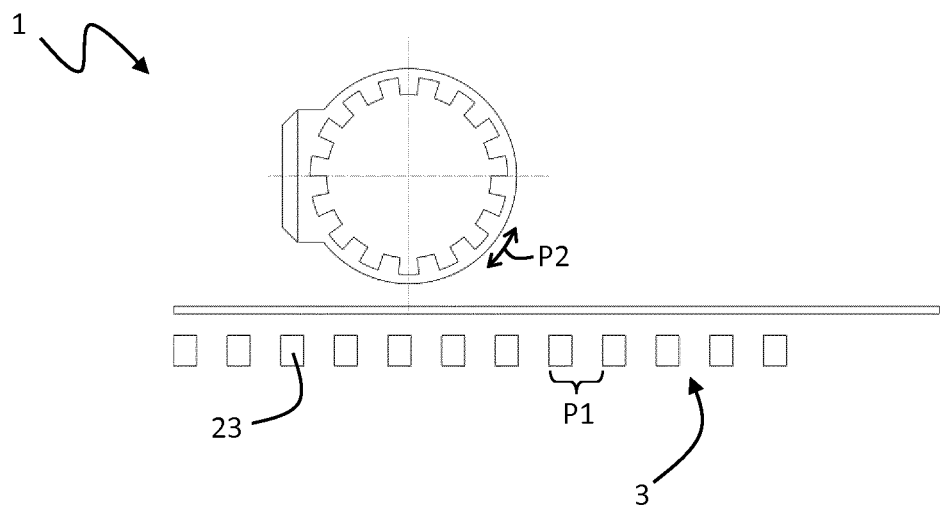
FIG. 7 shows a schematic cross-sectional cut view on an example of yet another embodiment of the magnetic rack-and-pinion coupling system according to the present disclosure together with an electric generator or motor.
Figure 8:
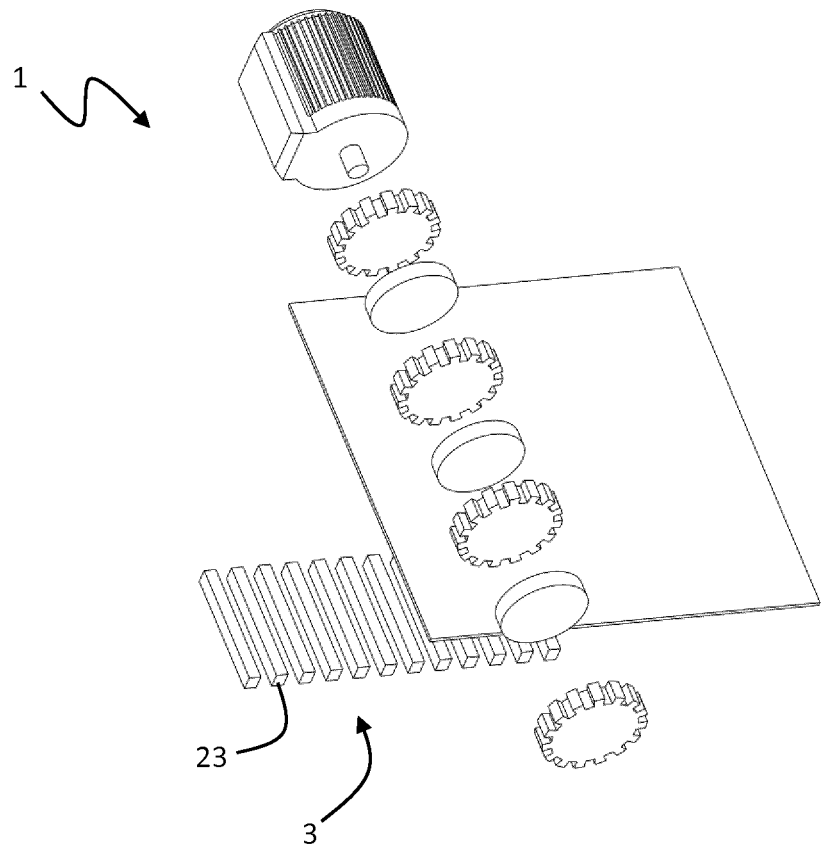
FIG. 8 shows a schematic exploded perspective view on an example of the embodiment shown in FIG. 7.

The embodiment of FIGS. 7 and 8 show a rack component 3 composed of a row of bars 23 without any skew angle α applied. Otherwise, the embodiment is the same as in FIGS. 4, 5 and 6.

Figure 9:
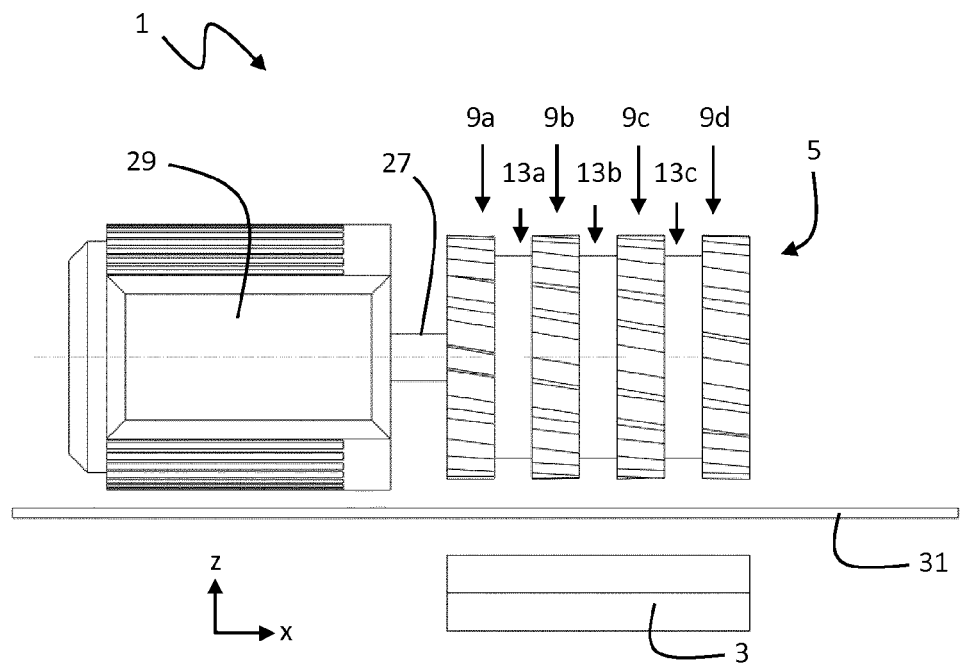
FIG. 9 shows a schematic side view on an example of yet another embodiment of the magnetic rack-and-pinion coupling system according to the present disclosure together with an electric generator or motor.
Figure 10:
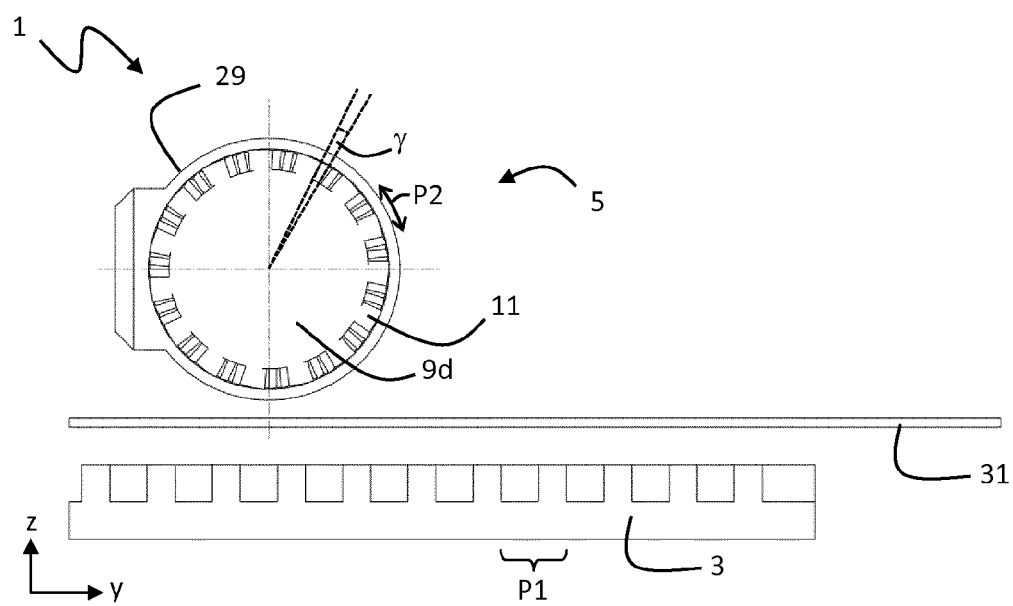
FIG. 10 shows a schematic cross-sectional cut view on an example of the embodiment shown in FIG. 9.
Figure 11:
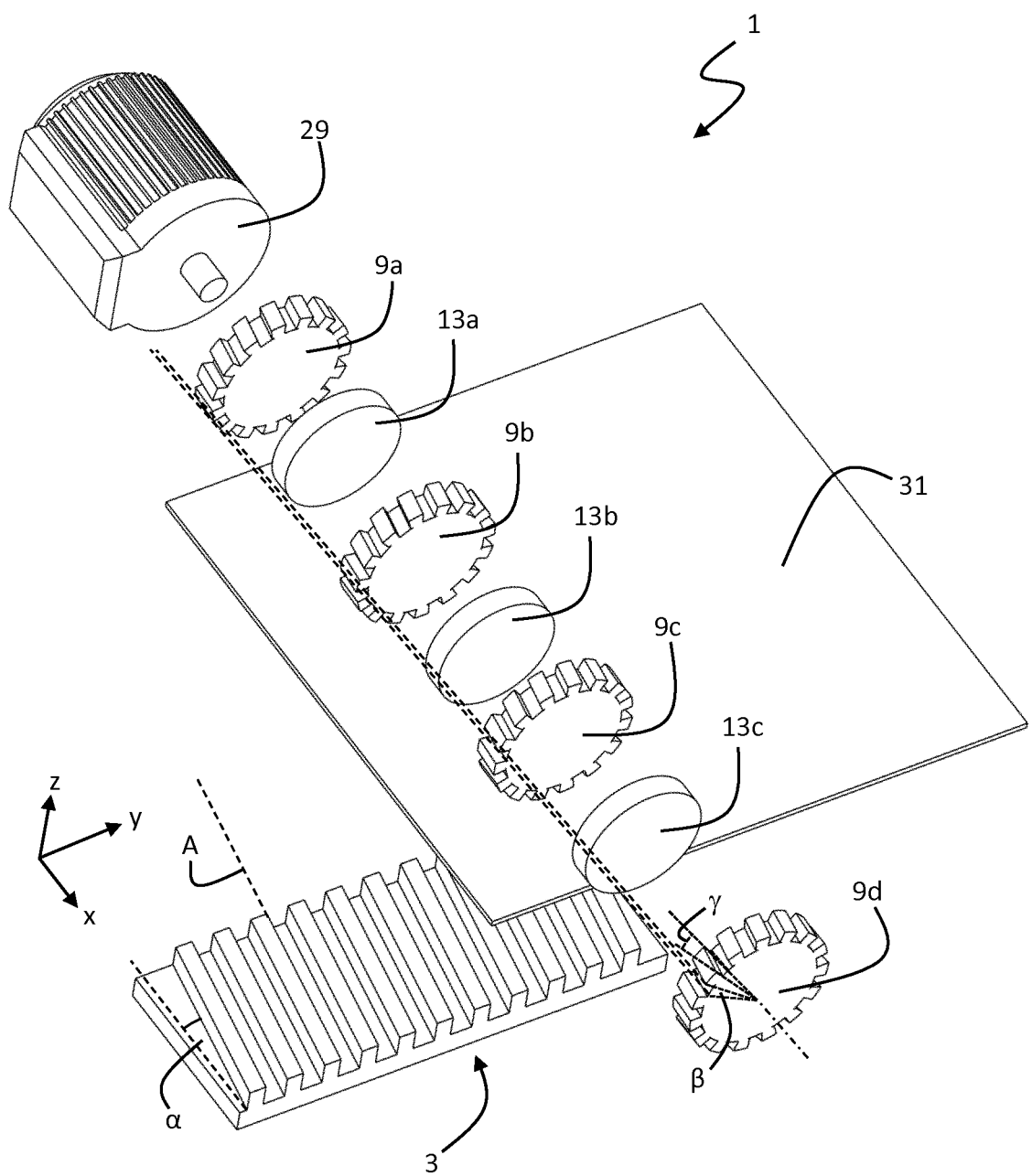
FIG. 11 shows a schematic exploded perspective view on an example of the embodiment shown in FIGS. 9 and 10.

The embodiment shown in FIGS. 9, 10 and 11 show an integral rack component 3 with a skew angle α applied to the first pattern of ferromagnetic structure in form of a crenelated top side. Accordingly, a shift angle β is applied in view of the angular position of neighbouring pinion discs 9a,b,c,d with relative to another. The shift angle β corresponds here to half a tooth width, i.e. 6° for 15 teeth 11 per pinion disc 9a,b,c,d and 15 tooth spaces 19 with the same angular width as the teeth 11. In addition, the teeth 11 of each pinion disc 9a,b,c,d are skewed by a twist angle γ about the rotor axis R to adapt the shape of the teeth 11 to the skewed rack component 3.

It should be noted that for all three embodiments shown in FIGS. 4 to 11, the ratio between the first period P1 defined by the first pattern of ferromagnetic structure and the second period P2 defined by the second pattern of ferromagnetic structure is approximately 1.25. The ratio may be chosen in the range of 0.8 to 1.5, such as in the range of 0.8 to 1.25. Furthermore, all embodiments shown in the Figures have a pinion stack component 5 with an axial through-hole 32 along the rotor axis R for receiving a rotor shaft 27. However, the pinion stack component 5 may be arranged in a drum or the stack is held together otherwise so that an axial through-hole 32 is not necessarily needed for the pinion stack component 5.

Figure 12:
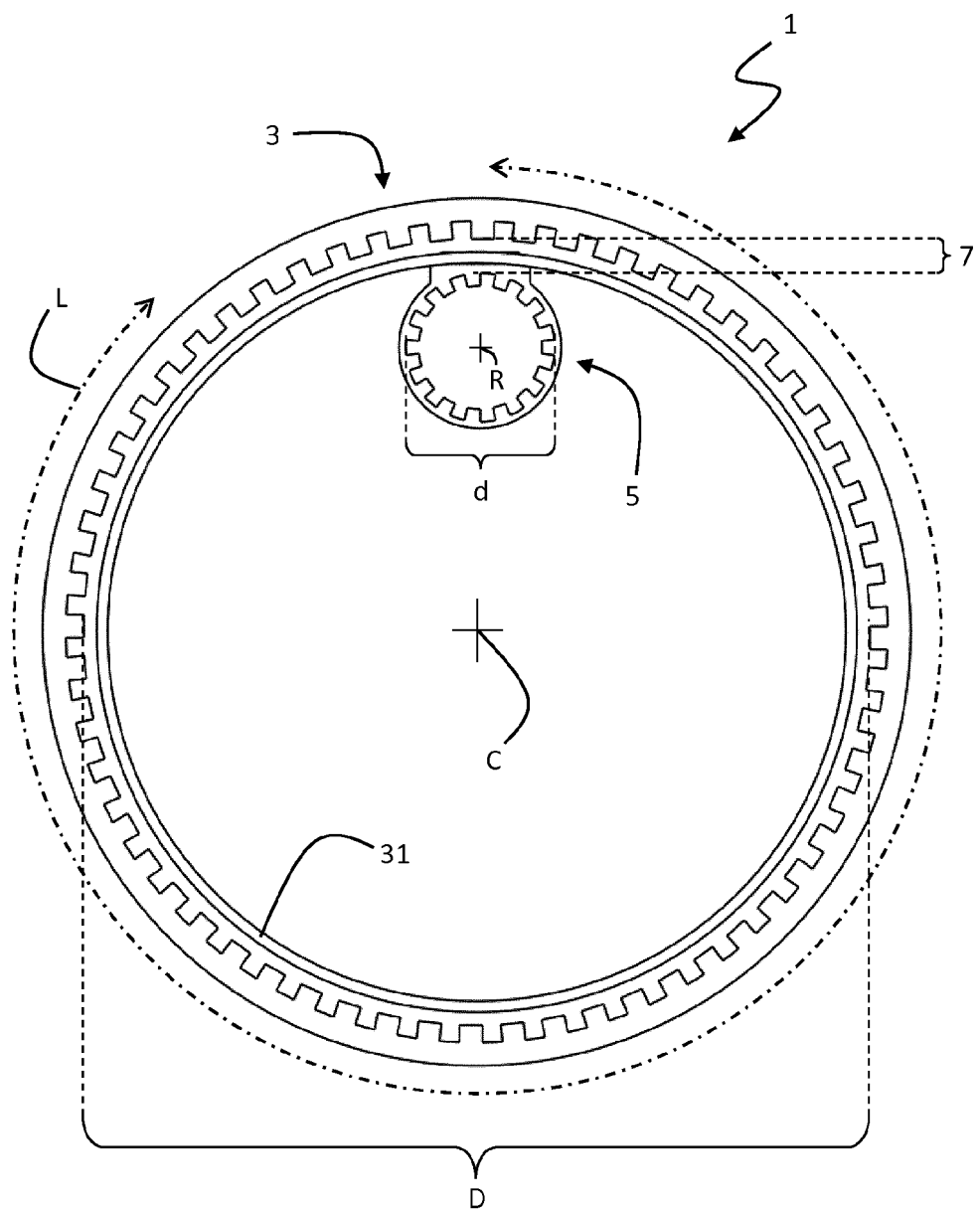
FIG. 12 shows a schematic view on another example of an embodiment of the magnetic rack-and-pinion coupling system according to the present disclosure.

FIG. 12 shows an embodiment in which the rack component 3 is arc-shaped but almost-linear in the limited area of magnetic coupling in the gap 7 between the pinion stack component 5 and the rack component 3. In this shown example, the first pattern of ferromagnetic structure of the rack component 5 is arranged along a full cylindrical plane having a centre axis C essentially parallel to the rotor axis R. The rack length axis L extends in circumferential direction along the cylindrical plane. The relative motion between the pinion stack component 5 and the rack component 3 may be a unidirectional, bidirectional, continuous or oscillating rotational motion along the circular path L. The diameter D of the cylindrical plane is here about five to six times larger than the diameter d of the pinion stack component 5. The first pattern of ferromagnetic structure faces here radially inward and, accordingly, the pinion stack component 5 is placed radially inward from the rack component 3. If it faced outward, the pinion stack component 5 would be placed radially outward from the rack component 3. Due to the substantial differences in diameter, i.e. D>>d, a rotational motion of the rack component 3 appears to the pinion stack component 5 as an almost-linear motion in the limited area of magnetic coupling between them.

Figure 13:
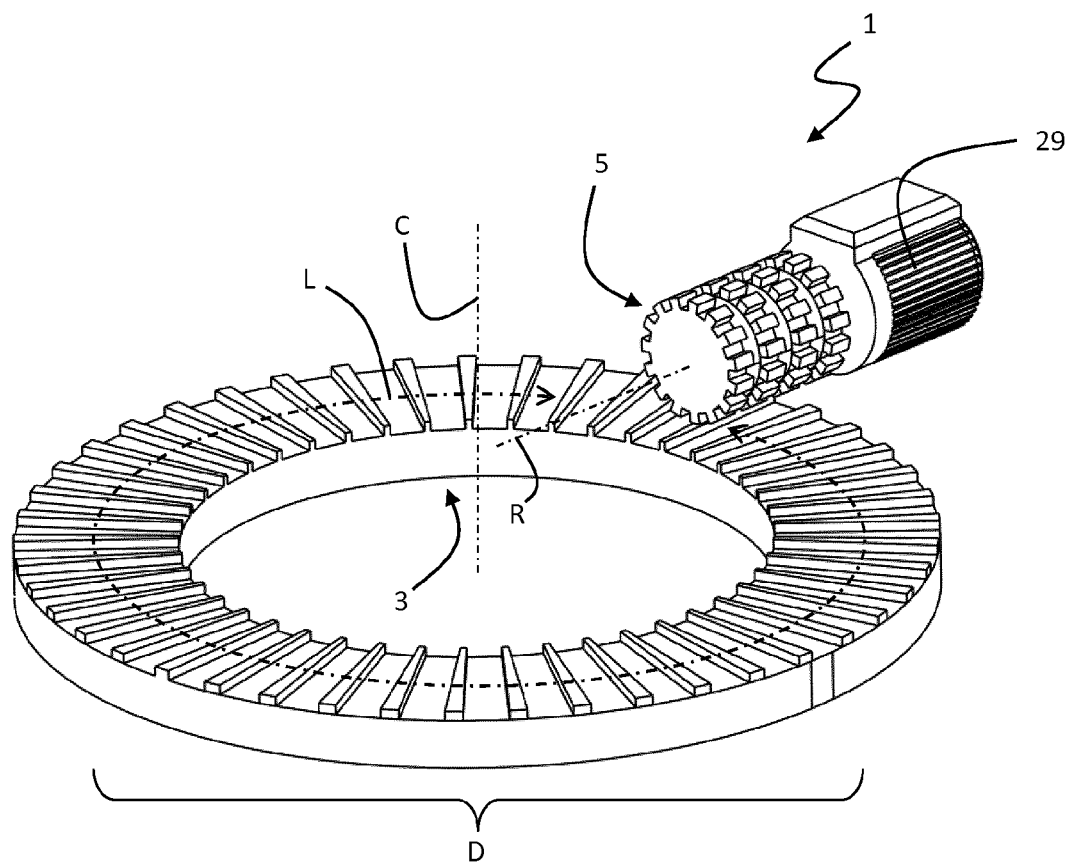
FIGS. 13 and 14 show a schematic perspective view and a side view, respectively, on yet another example of an embodiment of the magnetic rack-and-pinion coupling system according to the present disclosure.
Figure 14:
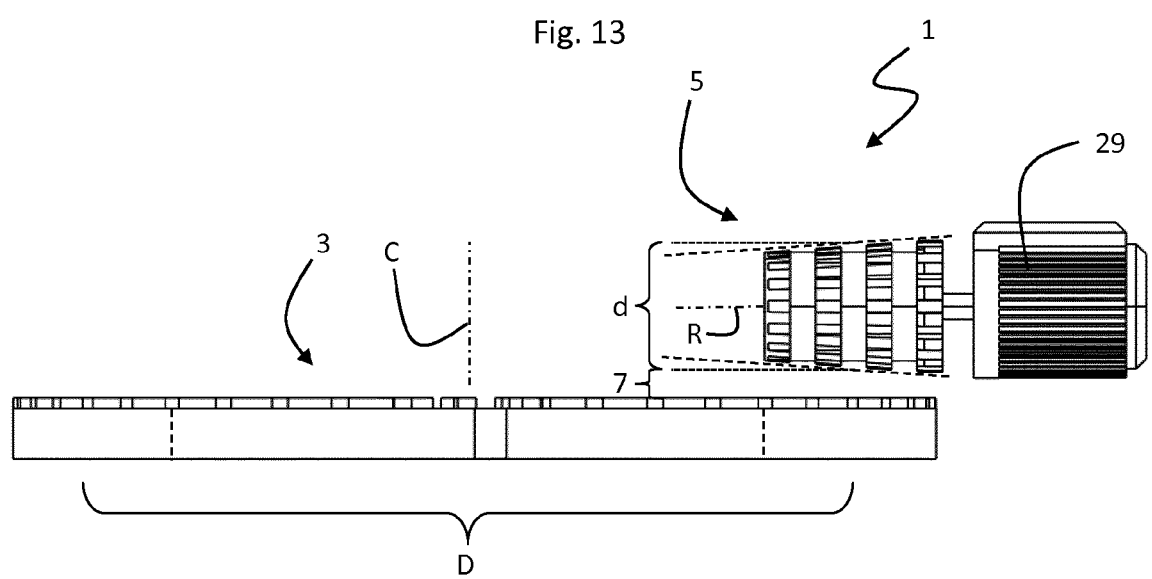

FIGS. 13 and 14 show another embodiment in which the rack component 3 is curved but almost-linear in the limited area of magnetic coupling in the gap 7 between the pinion stack component 5 and the rack component 3. The first pattern of ferromagnetic structure is here arranged along a full circular path on a full annular plane having a centre axis C essentially perpendicular to the rotor axis R, wherein the rack length axis L extends along the circular path in the annular plane. Analogous to the previously described embodiment, the average diameter D of the annular plane is five to six times larger than the average diameter d of the pinion stack component 5. Due to the substantial differences in diameter, i.e. D>>d, a rotational motion of the rack component 3 (unidirectional, bidirectional, continuous or oscillating) appears to the pinion stack component 5 as an almost-linear motion in the limited area of magnetic coupling in the gap 7 between them. The rotor axis R of the pinion stack component 5 points here radially inward, i.e. toward the centre axis C, above the annular plane of the rack component 3, and the velocity vector $\vec{v} = \hat{\omega} \times \vec{r}$ of the first pattern of ferromagnetic structure increases radially outward, i.e. away from the centre axis C, for a given angular velocity of the rack component 3. Therefore, the diameter of the individual pinion discs 9a-d differs along the rotor axis R accordingly. This means that radially more inwardly, i.e. closer to the centre axis C, located pinion discs 9a-d have a smaller diameter than radially more outward, i.e. further away from the centre axis C, pinion discs 9a-d to compensate for the radially outwardly increasing velocity vector $\vec{v} = \vec{\omega} \times \vec{r}$ of the first pattern of ferromagnetic structure. The pinion discs 9ad have here a conical frustrum shape with radially inwardly, i.e. toward the centre axis C, decreasing diameter. The gap 7 increases here radially inwardly, i.e. toward the centre axis C, but it may be kept essentially uniform by a bevelled first ferromagnetic structure of the rack component 3. The rack component 3 and the pinion stack component 5 may thus be coupled similar to bevel gears. Alternatively, or in addition, the rotor axis R could be tilted downward to achieve an essentially uniform gap 7.

Figures 15, 16, 17:
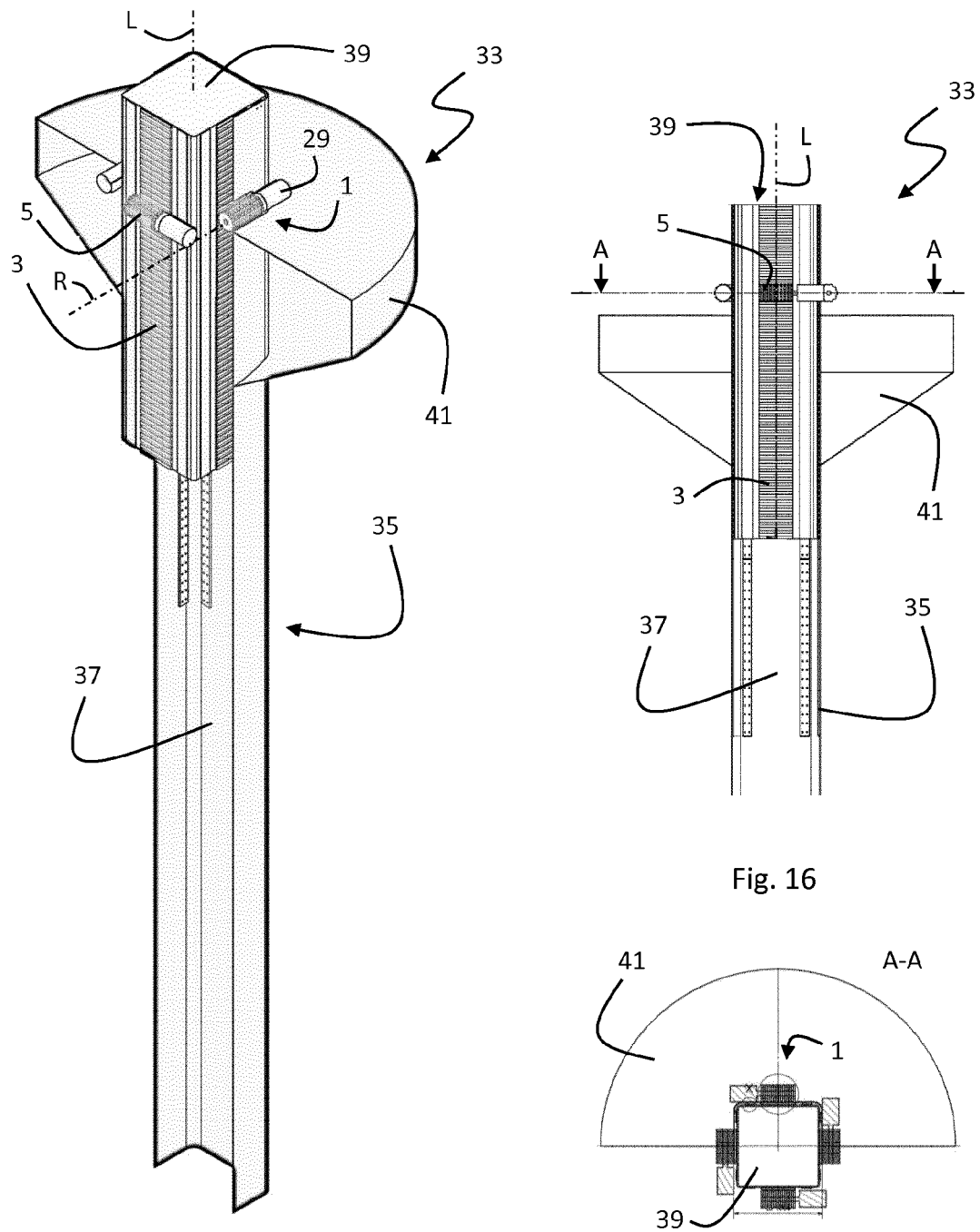
FIG. 15 shows a schematic perspective view on an example of an embodiment of a sea wave energy conversion system according to the present disclosure.
FIG. 16 shows a schematic side view on an example of the embodiment shown in FIG. 15.
FIG. 17 shows a schematic cross-sectional cut view along axis A-A on an example of the embodiment as shown in FIG. 16.

FIGS. 15, 16 and 17 show a sea wave energy conversion system 33 making use of a number (here four) of magnetic rack-and-pinion coupling systems 1 as described above. The sea wave energy conversion system 33 comprises a guiding structure 35 defining a tubular inner volume 37 having a multifaced (such as squared) cross-section and extending longitudinally along a linear axis L extending down into the water. The guiding structure may extend essentially corresponding to the vertical axis. The sea wave energy conversion system 33 further comprises a buoyance body 39 being movable within the tubular inner volume 37 along the linear axis L relative to the guiding structure 35. The sea wave energy conversion system 33 further comprises a number of magnetic rack-and-pinion coupling systems 1 located at all or some of the sides of the tubular inner volume 37. Each magnetic rack-and-pinion coupling systems 1 is configured to transfer a linear motion of the buoyance body 39 relative to the guiding structure 35 to a rotational motion of a rotor axis R for driving an associated electric generator 29. The rack component 3 of each magnetic rack-and-pinion coupling system 1 extends along the linear axis L at the associated lateral side fixed to the buoyant body 39. The pinion stack component 5 and the electric generator 29 are mounted to the guiding structure 35 at the associated lateral side to the tubular inner volume 37. The magnetic rack-and-pinion coupling systems 1 may for example be arranged in a four-fold rotational symmetry around the linear axis L at essentially the same or different height along the linear rack length axis L.

The guiding structure 35 may be attached and/or moored to a floating, preferably anchored, structure (not shown) in a way which allows almost free up and down motion of the guiding structure 35. Alternatively, the guiding structure 35 may be anchored or moored itself or fixed relative to the seabed. However, the guiding structure 35 in the shown embodiments is buoyant due to a buoyance portion 41 of the guiding structure 35. The buoyance portion 41 surrounds an upper section of the tubular inner volume 37. The guiding structure 35 thus follows heaving forces of sea waves quicker than the buoyance body 39 within the tubular inner volume 37 where it is somewhat shielded from the direct wave influence and therefore reacts with a delay and/or a different frequency. Thereby, the sea waves drive a motion of the buoyant body 39 relative to the buoyant guiding structure 35.

The guiding structure or some or all of the racks may additionally or alternatively be arranged at an angle rather than vertically. This may be advantageous for structures exploiting tide water to generate energy.

Figure 18C:
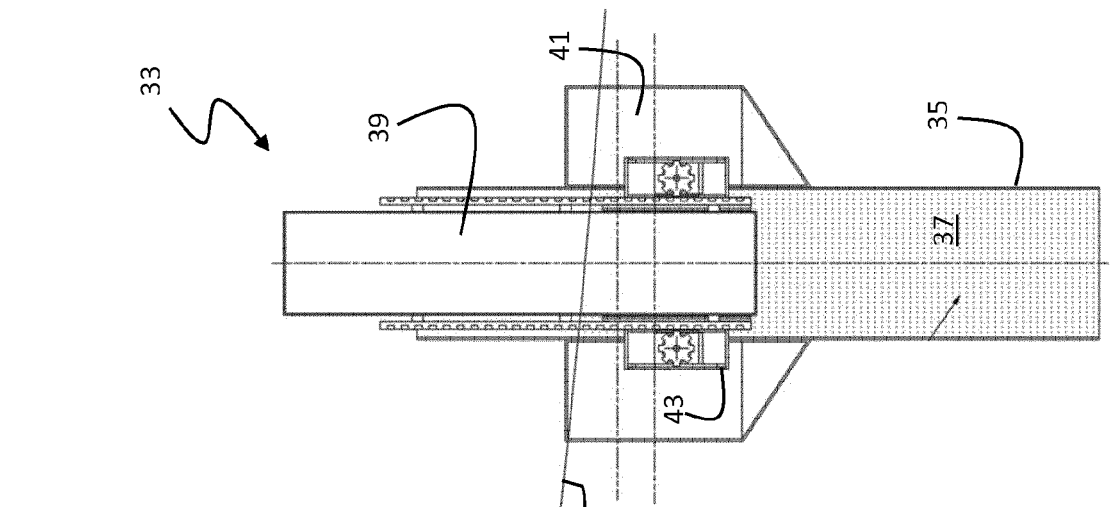
FIGS. 18a,b,c show schematic longitudinal cut views on an example of another embodiment of a sea wave energy conversion system according to the present disclosure in different states of motion.
Figure 18B:
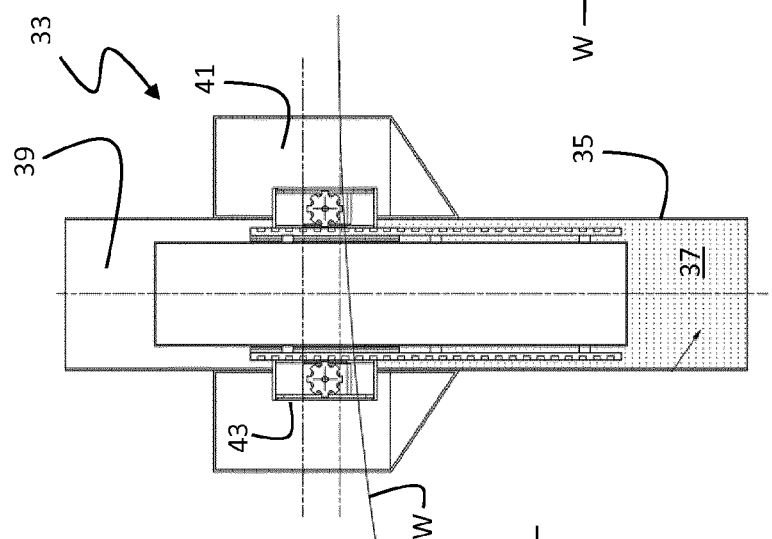
Figure 18A:
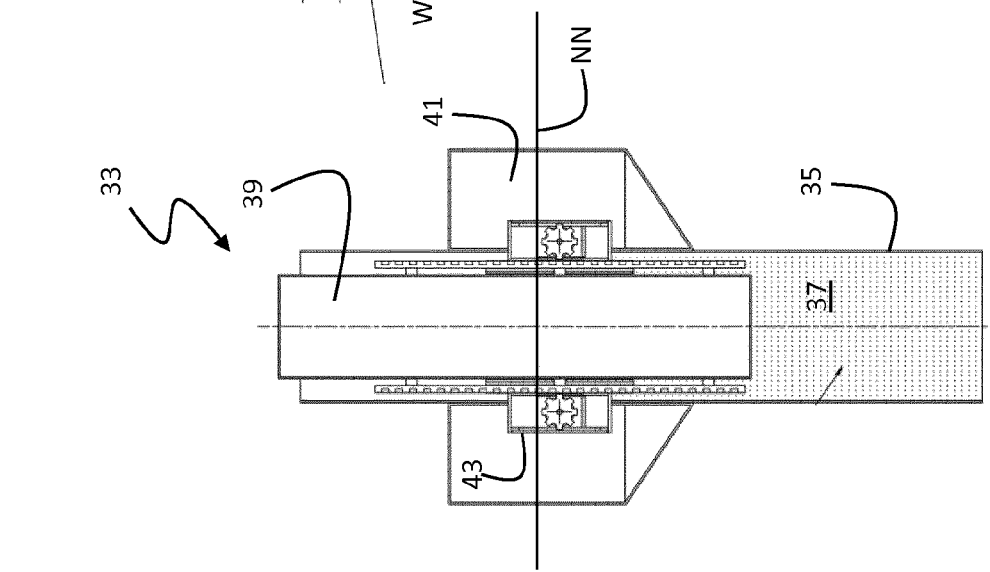

FIGS. 18a,b,c show three different stages of relative linear motion between the buoyance body 39 and the guiding structure 35 of another embodiment of the sea wave energy conversion system 33. The pinion stack components 5 of the magnetic rack-and-pinion coupling systems 1 are each enclosed in a housing 43 against the corrosive environment of sea water. FIG. 18a shows an equilibrium stage for a flat sea without waves (indicated by a virtual flat sea level NN). FIG. 18b shows the stage when a peak of a sea wave W passes the sea wave energy conversion system 33. The buoyant guiding structure 35 with the buoyant portion 41 follows quickly and is at a high altitude. The buoyance body 39 within the tubular inner volume 37 follows slower and is thus positioned low relative to the guiding structure 35. The opposite stage is shown in FIG. 18c when a trough of a sea wave W passes the sea wave energy conversion system 33. The buoyant guiding structure 35 with the buoyant portion 41 follows quickly and is at a low altitude, whereas the water level in the tubular inner volume 37 is still high so that the buoyance body 39 is positioned high relative to the guiding structure 35.

The magnetic rack-and-pinion coupling systems 1 provide a robust, efficient and low-maintenance solution for transferring the relative linear motion into a rotational torque for driving an electric generator 29, or for transferring a rotational motion of a motor 29 into a linear motion of the rack component 3 relative to the pinion stack component 5.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

LIST OF REFERENCE NUMERALS 1 magnetic rack-and-pinion coupling system
3 rack component
5 pinion stack component
7 gap
9a,b,c,d pinion discs
11 teeth
13a,b,c magnetic field producing elements
14 axial front side of magnetic field producing element
15 top land of teeth 16 axial end side of magnetic field producing element
17 bottom land of tooth spaces
19 tooth spaces
21 root of tooth
23 ferromagnetic bars
25 flanks of teeth
27 rotor axle
29 electric generator or motor
31 wall structure
33 sea wave energy conversion system
35 guiding structure
37 tubular inner volume
39 buoyance body
41 buoyant portion of guiding structure
43 housing
R rotor axis
L linear axis
C centre axis
D diameter of cylindrical or annular plane of rack component
D (average) diameter of pinion stack component
A lateral alignment direction
P1 first period
P2 second period
NN virtual flat sea level
W sea wave
a skew angle for rack component
R shift angle for rack component
Y twist angle for teeth

The invention claimed is:

1. A magnetic rack-and-pinion coupling system for contactless transfer of kinetic energy, the coupling system comprising:
a rack component comprising a first pattern of ferromagnetic structure that is repetitive along a rack length axis; and
a pinion stack component that is rotatable about a rotor axis, wherein the rack component and/or the pinion stack component are movable relative to each other along the rack length axis, and wherein the pinion stack component comprises a stack of pinion discs each comprising a second pattern of ferromagnetic structure which is repetitive along a circumference of a respective pinion disc of the stack of pinion discs, wherein at least one magnetic field producing element is sandwiched between neighbouring pinion discs of the stack of pinion discs, wherein the at least one magnetic field producing element has one magnetic pole at an axial front side of the at least one magnetic field producing element and another magnetic pole at an axial end side of the magnetic field producing element.

2. The magnetic rack-and-pinion coupling system according to claim 1, wherein the rack length axis extends at least partially along a linear, arc-shaped, circular and/or curved axis.

3. The magnetic rack-and-pinion coupling system according to claim 1, wherein the first pattern of ferromagnetic structure is arranged at least partially along a full or partial cylindrical plane having a center axis parallel to the rotor axis, wherein the rack length axis extends in circumferential direction along the cylindrical plane.

4. The magnetic rack-and-pinion coupling system according to claim 1, wherein the first pattern of ferromagnetic structure is arranged at least partially along a full or partial circular path on a full or partial annular plane having a center axis extending transversely to the rotor axis, wherein the rack length axis extends along the circular path.

5. The magnetic rack-and-pinion coupling system according to claim 1, wherein at least one of the magnetic field producing elements comprises a permanently magnetic disc.

6. The magnetic rack-and-pinion coupling system according to claim 5, wherein the magnetic field producing elements are arranged in such a way that the magnetic pole orientation alternates between neighbouring magnetic field producing elements.

7. The magnetic rack-and-pinion coupling system according to claim 1, wherein at least one of the magnetic field producing elements comprises a coil.

8. The magnetic rack-and-pinion coupling system according to claim 1, wherein the pinion stack component comprises a stack of N≥3 pinion discs and N−1 magnetic field producing elements wherein each magnetic field producing element is sandwiched between two neighbouring pinion discs.

9. The magnetic rack-and-pinion coupling system according to claim 1, wherein the second pattern of ferromagnetic structure is formed by teeth extending radially further than a diameter of the magnetic field producing element(s).

10. The magnetic rack-and-pinion coupling system according to claim 1, wherein the first pattern of ferromagnetic structure is formed by a row of ferromagnetic bars extending along a lateral alignment direction and/or by a side of the rack component having a crenelated shape along the rack length axis.

11. The magnetic rack-and-pinion coupling system according to claim 1, wherein the first pattern of ferromagnetic structure defines a first period and the second pattern of ferromagnetic structure defines a second period, wherein the ratio between the first period and the second period ranges between 0.8 and 1.5.

12. The magnetic rack-and-pinion coupling system according to claim 11, wherein the first period equals the second period.

13. The magnetic rack-and-pinion coupling system according to claim 1, wherein the lateral width of the first pattern of ferromagnetic structure across the rack length axis is the same as or larger than the axial width of the stack of pinion discs along the rotor axis.

14. The magnetic rack-and-pinion coupling system according to claim 1, wherein a longitudinal length of the first pattern of ferromagnetic structure along the rack length axis is at least twice as long as a diameter of the stack of pinion discs.

15. The magnetic rack-and-pinion coupling system according to claim 1, wherein the first pattern of ferromagnetic structure is skewed by an angle $\alpha$, wherein the angle $\alpha$ is spanned between a lateral alignment direction of the first pattern of ferromagnetic structure and a cross axis of the rack component perpendicular to the rack length axis.

16. The magnetic rack-and-pinion coupling system according to claim 1, wherein all pinion discs are identical.

17. The magnetic rack-and-pinion coupling system according to claim 1, wherein two neighbouring pinion discs have a rotational position shifted by an angle $\beta$ with respect to each other.

18. The magnetic rack-and-pinion coupling system according to claim 1, wherein the second pattern of ferromagnetic structure of each pinion disc is skewed by a twist angle $\gamma$ about the rotor axis.

19. The magnetic rack-and-pinion coupling system according to claim 1, further comprising a separating non-ferromagnetic wall structure extending along a gap between the first pattern of ferromagnetic structure and the second pattern of ferromagnetic structure.

20. The magnetic rack-and-pinion coupling system according to claim 1, wherein the first pattern of ferromagnetic structure and/or the second pattern of ferromagnetic structure is coated by a protective layer.

21. A sea wave energy conversion system comprising:
a guiding structure defining a rack length axis;
a buoyance body movable along the rack length axis relative to the guiding structure; and
at least one magnetic rack-and-pinion coupling system, wherein the at least one magnetic rack-and-pinion coupling system is configured to transfer a motion of the buoyance body relative to the guiding structure to a rotational motion of a rotor axis for driving at least one electric generator, the at least one magnetic rack-and-pinion coupling system comprising:
a rack component comprising a first pattern of ferromagnetic structure that is repetitive along the rack length axis; and
a pinion stack component that is rotatable about the rotor axis, wherein the rack component and/or the pinion stack component are movable relative to each other along the rack length axis, and wherein the pinion stack component comprises a stack of pinion discs each comprising a second pattern of ferromagnetic structure which is repetitive along a circumference of a respective pinion disc of the stack of pinion discs, wherein at least one magnetic field producing element is sandwiched between neighboring pinion discs of the stack of pinion discs, wherein the at least one magnetic field producing element has one magnetic pole at an axial front side of the at least one magnetic field producing element and another magnetic pole at an axial end side of the magnetic field producing element.

22. The sea wave energy conversion system according to claim 21, wherein the rack component of the at least one magnetic rack-and-pinion coupling system is mechanically coupled or fixed to the buoyance body and the pinion stack component of the at least one magnetic rack-and-pinion coupling system is mechanically coupled or mounted to the guiding structure.

23. The sea wave energy conversion system according to claim 21, further comprising M≥2 magnetic rack-and-pinion coupling systems, wherein the magnetic rack-and-pinion coupling systems are arranged in an M-fold rotational symmetry with respect to the rack length axis.

24. The sea wave energy conversion system according to claim 21, wherein the guiding structure is configured to be anchored or fixed relative to the seabed.

25. The sea wave energy conversion system according to claim 21, wherein the guiding structure is buoyant and configured to follow heaving forces of sea waves quicker or slower compared to the buoyance body.

26. The sea wave energy conversion system according to claim 21, wherein the guiding structure defines a tubular inner volume along the rack length axis, wherein the buoyant body is arranged at least partially within the tubular inner volume and configured to follow the sea water level within the tubular inner volume.

* * * * *